(12) United States Patent
Terada et al.

(10) Patent No.: US 9,671,295 B2
(45) Date of Patent: Jun. 6, 2017

(54) TERMINAL HEAD OF SHEATH TYPE TEMPERATURE SENSOR

(71) Applicant: Okazaki Manufacturing Company, Hyogo (JP)

(72) Inventors: Makoto Terada, Hyogo (JP); Masaru Yamana, Hyogo (JP); Kazuhide Okazaki, Hyogo (JP)

(73) Assignee: OKAZAKI MANUFACTURING COMPANY, Hyogo (JP)

( * ) Notice: Subject to any disclaimer, the term of this patent is extended or adjusted under 35 U.S.C. 154(b) by 367 days.

(21) Appl. No.: 14/419,725

(22) PCT Filed: Apr. 22, 2014

(86) PCT No.: PCT/JP2014/002270
§ 371 (c)(1),
(2) Date: Feb. 5, 2015

(87) PCT Pub. No.: WO2015/162641
PCT Pub. Date: Oct. 29, 2015

(65) Prior Publication Data
US 2016/0252404 A1    Sep. 1, 2016

(51) Int. Cl.
*G01K 7/04* (2006.01)
*G01K 7/02* (2006.01)
(Continued)

(52) U.S. Cl.
CPC ............... *G01K 7/023* (2013.01); *G01K 1/08* (2013.01); *G01K 2007/163* (2013.01)

(58) Field of Classification Search
CPC .................. G01K 7/023; G01K 2007/163
See application file for complete search history.

(56) References Cited

U.S. PATENT DOCUMENTS 6,062,095 A * 5/2000 Mulrooney ............ G01D 11/24
73/204.22
6,555,748 B1 * 4/2003 Gul ...................... H05K 5/0247
174/59

(Continued)

FOREIGN PATENT DOCUMENTS

GB          624335 A   * 6/1949 ............ G01K 7/023
JP       50-29501         9/1975
(Continued)

*Primary Examiner* — Minh Phan
*Assistant Examiner* — Leon W Rhodes, Jr.
(74) *Attorney, Agent, or Firm* — Pearne & Gordon LLP

(57) ABSTRACT

A terminal head, which is provided in a sheath type temperature sensor and is for connecting the sheath type temperature sensor and a cable, is structured such that, in order for replacement of the sheath type temperature sensor to be easily performed and in order to minimize the number of replacement parts, a terminal plate (2) of the terminal head (1) and the sheath type temperature sensor 3 are coupled using a pair of plug-in connectors (4, 5) and the coupling is held by a coupling nut (6). When replacing the sheath type temperature sensor (3), the leads (31) of the sheath type temperature sensor do not need to be detached from and attached to the terminal plate (2) at the replacement worksite, and the only replaced part other than the sheath type temperature sensor (3) is the one connector (5).

5 Claims, 3 Drawing Sheets

(51) Int. Cl.
*G01K 1/08* (2006.01)
*G01K 7/16* (2006.01)

(56) References Cited

U.S. PATENT DOCUMENTS

| | | | | |
|---|---|---|---|---|
| 8,911,148 B2* | 12/2014 | Martensson | ............ | G01K 1/08 338/226 |
| 2016/0134047 A1* | 5/2016 | Nishikawa | ............... | H02G 1/14 439/589 |

FOREIGN PATENT DOCUMENTS

| | | | |
|---|---|---|---|
| JP | 53132382 U | * | 10/1978 |
| JP | 54-70486 | | 5/1979 |
| JP | 09-68468 A | | 3/1997 |
| JP | 5368632 B1 | | 9/2013 |

\* cited by examiner

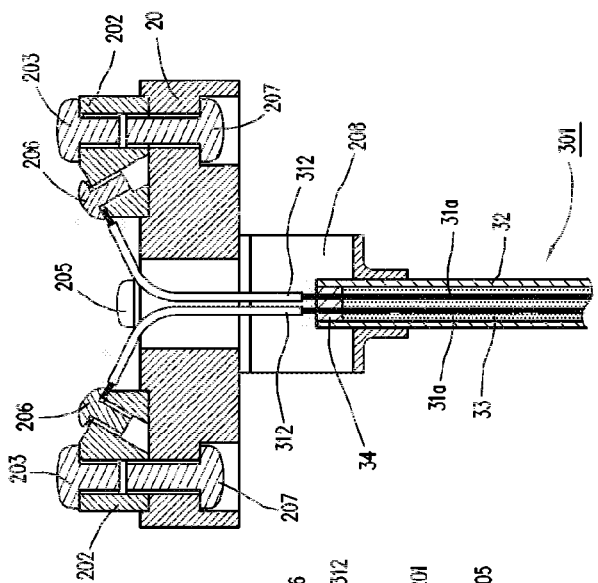
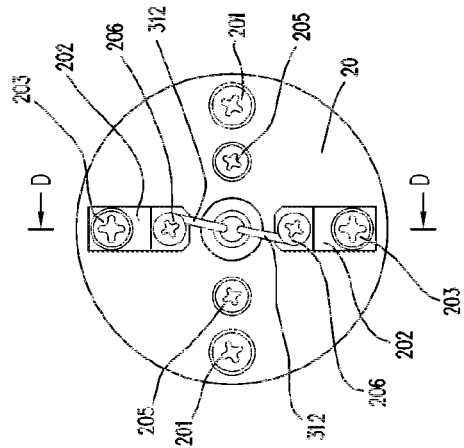
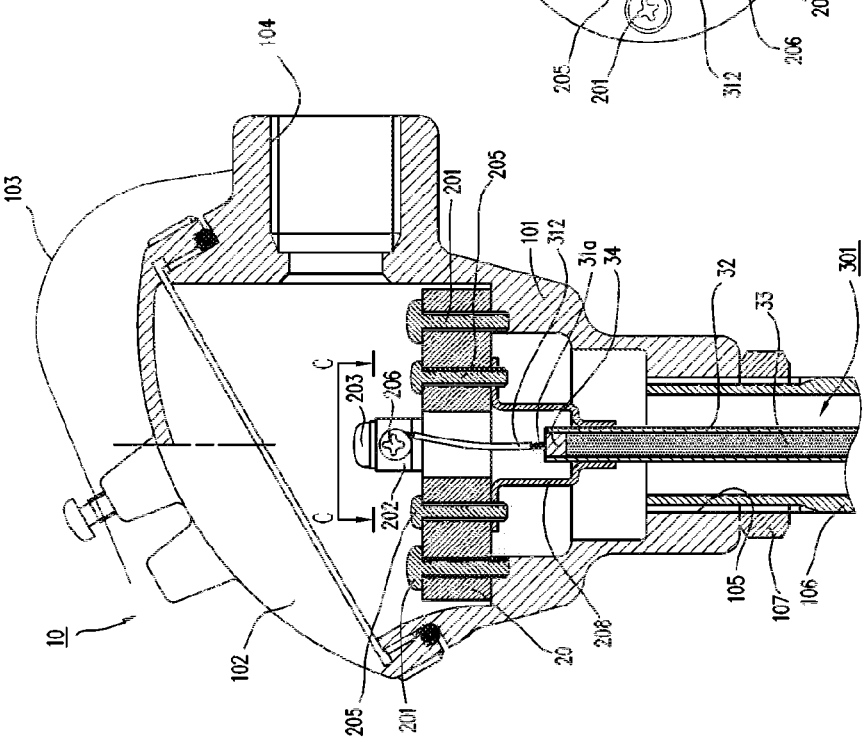
FIG. 5 C
FIG. 5 B
FIG. 5 A

TERMINAL HEAD OF SHEATH TYPE TEMPERATURE SENSOR

TECHNICAL FIELD

The present invention relates to a terminal head of a sheath type temperature sensor for connecting thermocouple element wires of a sheathed thermocouple and a compensating lead cable, or connecting leads of a sheathed resistance temperature detector and an extension cable.

BACKGROUND ART

A sheathed thermocouple or a sheathed resistance temperature detector which are sheath type temperature sensors, is connected to a cable for leading a measurement signal to a receiver, that is to say a compensating lead cable is connected to the sheathed thermocouple, and an extension cable is connected to the sheathed resistance temperature detector. One type of mechanism for making these connections is a terminal head (also referred to as a terminal box), to which the present invention is directed.

FIG. 4 shows the connection relationship between sheath type temperature sensors and cables. FIG. 4(a) shows the connection relationship between a sheathed thermocouple 301 and a compensating lead cable 701, and FIG. 4(b) shows the connection relationship between a sheathed resistance temperature detector 302 and an extension cable 702. The portion enclosed with a dashed line is the connection portion in the terminal head. Note that although FIG. 4 shows cross-sectional diagrams, external forms are shown for a coating 71 on the compensating lead cable 701 and the extension cable 702, insulating coatings 72 on compensating leads 731 of the compensating lead cable 701 and leads 732 of the extension cable 702, and a resistance temperature detector element 35. Also, portions with the same functions in FIGS. 4(a) and 4(b) are denoted by the same reference numerals.

In the sheathed thermocouple 301, one pair of thermocouple element wires 31a is housed in a metal sheath 32 via inorganic insulating powder 33 such as magnesia or alumina. In the terminal head, the thermocouple element wires 31a are connected to compensating leads 731 that are exposed from respective insulating coatings 72 and a coating 71 of the compensating lead cable 701.

In the sheathed resistance temperature detector 302, a resistance temperature detector element 35 and leads 31b thereof are housed inside a metal sheath 32 via inorganic insulating powder 33 such as magnesia or alumina. In the terminal head, the leads 31b of the resistance temperature detector element 35 are connected to leads 732 that are exposed from respective insulating coatings 72 and a coating 71 of the extension cable 702. As is widely known, temperature measurement is performed by the resistance temperature detector element 35 using a two wire, three wire, or four wire method depending on the number of lead 31b branches from the resistance temperature detector element 35, and FIG. 4(b) shows the case where the three wire method is used.

In both the sheathed thermocouple 301 and the sheathed resistance temperature detector 302, the end of the sheath 32 is provided with a resin seal 34 so as to prevent the generation of temperature measurement error due to a reduction in the insulation resistance of the inorganic insulating powder 33 brought about by the entrance of moisture.

The general structure of a conventional terminal head will now be described with reference to FIG. 5, which shows the terminal head of a sheathed thermocouple. FIG. 5(a) is a cross-sectional diagram of a terminal head 10. FIG. 5(b) is a view along arrows C-C in FIG. 5(a), and FIG. 5(c) is a cross-section taken along D-D in FIG. 5(b). The external form of the left half of a cover 102 is shown in FIG. 5(a).

An outer frame body 101 has an upper opening to which the cover 102 is screwed, a side opening 104, and a bottom opening 105, and the cover 102 is connected to the outer frame body 101 by a chain 103 in order to prevent loss.

Inside the outer frame body 101, a terminal plate 20 made of an electrical insulating material is fixed to the outer frame body 101 via multiple terminal plate fixing screws 201. Two terminal fittings 202 are fixed to the terminal plate 20 by terminal fitting fixing screws 207, and a sensor wiring terminal 206 and a cable wiring terminal 203 are attached to each of the terminal fittings 202. These two types of terminals in each pair are electrically conducted to each other due to the terminal fittings 202.

Also, a sheath attachment fitting 208 is attached to the terminal plate 20 by sheath attachment fitting firing screws 205, a sheath 32 of the sheathed thermocouple 301, which has been inserted through the bottom opening 105 of the outer frame body 101, is welded to the sheath attachment fitting 208, and thus the position of the sheathed thermocouple 301 is fixed by the sheath attachment fitting 208.

The end of the sheathed thermocouple 301 is provided with a resin seal 34, insulating tubes 312 cover the pair of thermocouple element wires 31a protruding from the sheath 32 in order to prevent contact between them, and the tips of the thermocouple element wires 31a are connected to the sensor wiring terminals 206.

A protective tube 106 for preventing deformation of and damage to the sheathed thermocouple 301 is fixed to the bottom opening 105 of the outer frame body 101 by screwing together a locknut 107 and the outer frame body 101.

A compensating lead cable from a receiver (not shown in FIG. 5) is inserted through the side opening 104 of the outer frame body 101, and the compensating leads thereof are connected to the cable wiring terminals 203.

The sheathed thermocouple 301 and the compensating lead cable are connected as described above. Note that the number of sets of a sensor wiring terminal 206, a cable wiring terminal 203, and a terminal fitting 202 that is needed is the same as the number of leads that the sheath type temperature sensor has. There are two sets in the case of the sheathed thermocouple 301 housing one pair of thermocouple element wires 31a as shown in FIG. 5, but there are four sets in the case of a double element type sheathed thermocouple that houses two pairs of thermocouple element wires, and there are two sets, three sets, and four sets respectively in the above-described cases of two wire, three wire, and four wire type sheathed resistance temperature detectors.

Also, in the case of the sheathed resistance temperature detector 302, the thermocouple element wires 31a correspond to the leads 31b, the compensating lead cable 701 corresponds to the extension cable 702, and the compensating leads 731 correspond to the leads 732 of the extension cable as shown in FIG. 4.

In the following, the sheathed thermocouple 301 and the sheathed resistance temperature detector 302 are collectively referred to as a sheath type temperature sensor, the thermocouple element wires 31a and the leads 31b are collectively referred to as sheath type temperature sensor leads, the compensating lead cable 701 and the extension cable 702 are collectively referred to as a cable, and the compensating leads 731 of the compensating lead cable 701 and the leads 732 of the extension cable 702 are collectively referred to as cable leads.

Besides the shape shown in FIG. 5, examples of the shape of a terminal head include the shapes shown in FIG. 1 of Patent Document 1, FIG. 2 of Patent Document 2. FIGS. 1 and 4 of Patent Document 3, and FIG. 4 of Patent Document 4. However, the basic structure is the same as that in FIG. 5 in all of these cases, that is to say an outer frame body with a cover (referred to as a body in Patent Document 1, a terminal box in Patent Document 2, an outer frame body in Patent Document 3, and a terminal housing in Patent Document 4) is internally provided with a terminal plate (referred to as a terminal block in Patent Document 1, a terminal plate in Patent Documents 2 and 3, and a terminal board in Patent Document 4) that is fixed to the outer frame body, and wiring terminals (referred to as terminal fittings in Patent Document 1, terminal blocks in Patent Document 2, wiring screws in Patent Document 3, and connection terminals or terminals in Patent Document 4) are provided on the terminal plate. Also, all of these cases are the same in that a sheath type temperature sensor inserted through a bottom opening in the outer frame body is connected to a cable inserted through a side opening, using the wiring terminals as junctions.

PRIOR ART DOCUMENT

Patent Document

| [Patent Document 1] | JP Utility Model Application No. S52-142643 (JP S54-70486U) microfilm |
|---|---|
| [Patent Document 2] | JP H9-68468A |
| [Patent Document 3] | JP 5368632B |
| [Patent Document 4] | JP S50-29501Y |

SUMMARY OF INVENTION

Problem to be Solved by the Invention

If the sheath type temperature sensor 801 needs to be replaced due to failure or degradation, replacement can be performed as follows in the case of the terminal head 10 having the conventional structure shown in FIG. 5.

First, the cover 102 is removed from the outer frame body 101, the cable leads are removed from the cable wiring terminals 203, and the terminal plate fixing screws 201 are removed. Then, the terminal plate 20 and its accompanying cable wiring terminals 203, sensor wiring terminals 206, terminal fittings 202, terminal fitting fixing screws 207, sheath attachment fitting 208, and sheath attachment fitting fixing screws 205, as well as the sheath type temperature sensor 301 fixed to the sheath attachment fitting 208 are, as one piece, pulled out through the upper opening in the outer frame body 101 from which the cover 102 was detached.

Subsequently the sheath attachment fitting 208 and the sheath type temperature sensor 301 fixed thereto are removed from the terminal plate 20 by removing the leads 31*a* of the sheath type temperature sensor 301 from the sensor wiring terminals 206 and then removing the sheath attachment fitting fixing screws 205.

Next, assembly is performed using the opposite sequence. A prepared new sheath type temperature sensor 301 with a new sheath attachment fitting 208 welded thereto is attached to the terminal plate 20 using the sheath attachment fitting fixing screws 205, insulating tubes 312 are fitted around the leads 31*a* extending from the sheath type temperature sensor 301, and then the tips of the leads 31*a* are connected to the sensor wiring terminals 206.

Subsequently, the terminal plate 20 and its accompanying cable wiring terminals 203, sensor wiring terminals 206, terminal fittings 202, terminal fitting fixing screws 207, sheath attachment fitting 208, and sheath attachment fitting fixing screws 205, as well as the sheath type temperature sensor 301 fixed to the sheath attachment fitting 208 are, as one piece, inserted through the upper opening in the outer frame body 101.

Lastly the terminal plate 20 is fixed to the outer frame body 101 using the terminal plate fixing screws 201, the cable leads are connected to the cable wiring terminals 203, and then the cover 102 is screwed to the outer frame body 101.

The procedure for replacing the sheath type temperature sensor in this way is roughly the same with the terminal heads having the structures shown in the above-described figures of Patent Documents 1 to 3, with the exception of slight differences in the number of fixing screws in performing removal and attachment and the like.

In this replacement, the removal and attachment of the terminal plate fixing screws 201 and the sheath attachment fitting fixing screws 205 and the withdrawal and insertion of the sheath type temperature sensor 301, the terminal plate 20, and the like as one piece are easy tasks, and since extremely thick leads or extremely thin leads are not generally used as the cable leads, the removal of these leads from the cable wiring terminals 203 and connection to the same cable wiring terminals 203 are not difficult tasks. However, there has been the problem that the removal and attachment of the leads 31*a* of the sheath type temperature sensor from and to the sensor wiring terminals 206 are difficult tasks compared to the above tasks, depending on the situation.

Specifically if the outer sheath diameter of the sheath type temperature sensor 301 is low, and the leads 31*a* housed inside the sheath are thin, the leads 31*a* are not easily visible and are easily severed, and thus there has been the problem that the connection of the leads 31*a* to the sensor wiring terminals 206 with limited tools at the site where the terminal head 10 is installed is a difficult task that requires worker experience and labor time. Also, if the sheath outer diameter is thick, and the leads 31*a* housed inside the sheath are thick, it is not easy to bend the leads 31*a*, and thus there has been the problem that the removal of the leads 31*a* from the sensor wiring terminals 206 and the connection of leads 31*a* to the sensor wiring terminals 206 with limited tools at the site where the terminal head 10 is installed is a difficult task that requires worker experience and labor time. For example, with a sheath type temperature sensor having a sheath outer diameter of 3.2 mm, the connection of the leads to the sensor wiring terminals 206 is difficult since the leads are thin with a diameter of approximately 0.5 mm, and with a sheath type temperature sensor having a sheath outer diameter of 20 mm, the removal of the leads from the sensor wiring terminals 206 is difficult since the thermocouple element wires are thick with a diameter of approximately 3 mm.

A terminal plate that is divided into an upper and a lower layer that are integrated by the insertion of split pins is shown in the terminal head of Patent Document 4. Since the sheath type temperature sensor is fixed to the upper-layer terminal plate, the sheath type temperature sensor can be replaced by removing the sheath type temperature sensor while still fixed to the upper-layer terminal plate, and then attaching a prepared new sheath type temperature sensor attached to a new upper-layer terminal plate.

With this structure, the task of removing the leads of the sheath type temperature sensor from the wiring terminals provided on the upper-layer terminal plate and the task of connection to the wiring terminals can be carried out at the factory, which has a full range of equipment, and thus the above-described problem of fieldwork does not arise. However the upper-layer terminal plate having a complex structure also needs to be replaced every time the sheath type temperature sensor is replaced, and thus there is the separate problem of an increase in replacement part cost.

Note that assuming the case where this increase in cost is tolerated, and the terminal plate is also replaced when replacing the sheath type temperature sensor with the terminal heads shown in FIG. 5 and above-described Patent Documents 1 to 3 as well, there is no need for the task of removing the leads of the sheath type temperature sensor from the wiring terminals provided on the terminal plate, and the task of connection to the wiring terminals can be performed at the factory, and thus the problem of the fieldwork being difficult depending on the diameter of the leads does not arise.

As described above, conventional terminal heads of sheath type temperature sensors have the problem that when replacing the sheath type temperature sensor due to failure or degradation, the field work of removing the leads of the sheath type temperature sensor from the wiring terminals or connection to the wiring terminals is difficult depending on the diameter of the leads, and replacing the terminal plate as well in order to avoid this problem has the problem of an increase in cost.

The present invention has been achieved in light of the above-described problems. An object of the present invention is to provide a terminal head of a sheath type temperature sensor in which, when replacing the sheath type temperature sensor, there is no need for field work for removing the leads of the sheath type temperature sensor from the wiring terminals and for connection to the wiring terminals, and an increase in cost, is suppressed by minimizing the number of parts replaced along with the sheath type temperature sensor.

Means for Solving the Problems

First Aspect

A first aspect of the present invention is a terminal head of a sheath type temperature sensor provided for connection of a sheath type temperature sensor, in which a temperature sensor is housed in a tube-shaped metal sheath via inorganic insulating powder, to a cable for transmission of a signal from the temperature sensor, the terminal head including:

an outer frame body having an upper opening formed in an upper portion, a side opening that is formed in a side portion and receives insertion of the cable, and a bottom opening that is formed in a bottom portion and receives approximately vertical insertion of the sheath type temperature sensor;

a cover attached to the upper opening of the outer frame body by threaded mating;

a terminal plate that is made of an electrical insulating material, is fixed to an inner portion of the outer frame body by a plurality of terminal plate fixing screws, has a smaller horizontal dimension than the horizontal dimension of the upper opening of the outer frame body and is provided at a position at which, by removing the terminal plate fixing screws and moving the terminal plate vertically upward, the terminal plate can be removed from the outer frame body through the upper opening of the outer frame body from which the cover was detached;

terminal fittings attached to an upper surface of the terminal plate, the number of terminal fittings being the same as the number of leads of the sheath type temperature sensor;

cable wiring terminals for respectively connecting leads of the cable to the terminal fittings by threaded mating to the terminal fittings;

a pair of plug-in connectors, one of which is a male connector in which the same number of male electrode pins as the number of leads of the sheath type temperature sensor are provided in a body made of electrical insulating resin, and the other of which is a female connector in which the same number of female electrode pins as the number of electrode pins of the male connector are provided in a body made of electrical insulating resin, one connector out of the male connector and the female connector being attached to the terminal plate, and the other connector being attached to an upper end portion of the sheath of the sheath type temperature sensor; and a coupling nut that, in a state in which the connector attached to the terminal plate side and the connector connected to the sheath type temperature sensor side are coupled, holds the coupled state by threaded fastening at positions that span the two connectors, wherein the connector attached to the terminal plate side is fixed to the terminal plate in an orientation in which the connector attached to the sheath type temperature sensor side is coupled thereto from below, and the electrode pins of the connector attached to the terminal plate side and the cable wiring terminals are electrically connected by the terminal fittings and connecting conductors that connect upper end portions of the electrode pins and the terminal fittings, the connector attached to the sheath type temperature sensor side is fixed to the sheath type temperature sensor in an orientation in which the connector attached to the terminal plate side is coupled thereto from above, and is fixed in a state in which the upper end portion of the sheath of the sheath type temperature sensor is inserted into a lower portion of the cylindrical body of the connector attached to the sheath type temperature sensor side such that the sheath type temperature sensor is approximately vertical in the coupled state, and the leads of the sheath type temperature sensor protruding from the sheath are respectively connected to lower end portions of the electrode pins of the connector attached to the sheath type temperature sensor side, and in a state in which the terminal plate, the terminal fittings, the cable wiring terminals, the pair of plug-in connectors, the coupling nut, and the sheath type temperature sensor axe assembled, the horizontal dimension of the assembled one piece does not exceed the horizontal dimension of the terminal plate.

According to the present invention, the sheath type temperature sensor is replaced by removing the cover of the outer frame body and the terminal plate fixing screws, then removing the leads of the cable that are connected to the cable wiring terminals, and then removing the one piece constituted by: the terminal, plate with the terminal fittings, the cable wiring terminals, the connecting conductors, and the one connector out of the pair of plug-in connectors attached thereto; the connector on the sheath type temperature sensor side held in the state of being coupled to the other connector by the coupling nut; and the sheath type temperature sensor with the connector on the sheath type temperature sensor side fixed thereto. By then moving the one piece vertically upward, it is possible to remove the one piece from the outer frame body through the upper opening in the outer frame body. Then, after the one piece is removed from the outer frame body, the coupling nut is loosened, the connector on the sheath type temperature sensor side with the sheath type temperature sensor fixed thereto is removed from the connector on the terminal plate side, a prepared new connector on the sheath type temperature sensor side fixed to a new sheath type temperature sensor is coupled to the connector on the terminal plate side, and the coupling is held by fastening the coupling nut. The piece re-integrated in this way is then inserted through the upper opening in the outer frame body and fixed to the outer frame body by the terminal plate fixing screws of the terminal plate, the leads of the cable are connected to the cable wiring terminals, and the cover of the outer frame body is screwed to the outer frame body and thus the replacement of the sheath type temperature sensor is complete. In this way according to the present invention, the need to perform the task of removing the leads of the sheath type temperature sensor from the wiring terminals and the task of connection to the wiring terminals at the sheath type temperature sensor replacement worksite is eliminated, and the parts other than the sheath type temperature sensor that need to be replaced are limited to the connector on the sheath type temperature sensor side, thus making it possible to minimize the number of replaced parts and suppress an increase in cost.

Note that since the coupling of the one connector and the other connector is held by the fastening of the coupling nut that spans the connectors, and the connectors are decoupled by loosening the coupling nut, the coupling and decoupling of the pair of plug-in connectors can be performed easily even at the sheath type temperature sensor replacement worksite.

Second Aspect

In the first aspect, the coupling of the pair of plug-in connectors is held by a coupling nut. Instead, in a second aspect of the present invention, out of the pair of plug-in connectors, a side surface of one of the connectors is provided with a plurality of recessed portions, the other connector is provided with a plurality of arms that have hook-shaped tips and are made of the same electrical insulating resin as the body of the other connector, and the coupling of the pair of plug-in connectors is held by engaging the hook-shaped portions of the arms of the other connector with the recessed portions of the one connector.

According to the present invention, similarly to the first aspect, the need to perform the task of removing the leads of the sheath type temperature sensor from the wiring terminals and the task of connection to the wiring terminals at the sheath type temperature sensor replacement worksite is eliminated, and the parts other than the sheath type temperature sensor that need to be replaced are limited to the connector on the sheath type temperature sensor side, thus making it possible to minimize the number of replaced parts and suppress an increase in cost.

In the present aspect, the coupling is held using the elasticity of the electrical insulating resin that is the material making up the bodies of the connectors. The connectors are coupled with the arms pulled outward, the coupling is held when the arms revert to their original positions such that the hook-shaped portions engage with the recessed portions, and decoupling can be performed while the arms are pulled outward, and thus, similarly to the first aspect, the coupling and decoupling of the one connector and the other connector out of the pair of plug-in connectors can be performed easily at the sheath type temperature sensor replacement worksite.

Third Aspect

Instead of the method of holding the coupling of the pair of plug-in connectors in the first and second aspects, in a third aspect, out of the pair of plug-in connectors, the male connector and the female connector are both provided with a cylindrical portion on sides thereof on which the connectors are coupled, the cylindrical portion of at least one of the connectors is at an end on a side that comes into contact with the other connector, and the one connector and the other connector are coupled by the cylindrical portion of the other connector being inserted into the cylindrical portion provided at the end of the one connector, a plurality of projections are formed on an outer surface of the cylindrical portion of the other connector, surfaces of the projections on an insertion direction side being inclined in a direction opposite to the insertion direction, and surfaces of the projections on the counter insertion direction side being inclined in the insertion direction, and slits extending in approximately an axial direction are formed on respective sides of each of the projections, the cylindrical portion of the one connector is provided with through-holes or recessed portions in an inner surface that respectively correspond to the projections provided on the outer surface of the other connector, and coupling of the one connector and the other connector is held by the projections provided on the other connector being respectively inserted into the through-holes or the recessed portions of the one connector.

According to the present invention, similarly to the first and second aspects, the need to perform the task of removing the leads of the sheath type temperature sensor from the wiring terminals and the task of connection to the wiring terminals at the sheath type temperature sensor replacement worksite is eliminated, and the parts other than the sheath type temperature sensor that need to be replaced are limited to the connector on the sheath type temperature sensor side, thus making it possible to minimize the number of replaced parts and suppress an increase in cost.

In the present aspect as well, the coupling is held using the elasticity of the electrical insulating resin making up the bodies of the connectors. The projections on the inner cylindrical portion can move a large amount in the diameter direction due to the existence of the slits. For this reason, in the insertion of the inner cylindrical portion into the outer cylindrical portion, when the end of the outer cylindrical portion reaches the projections, the projections are pushed inward by the end of the cylindrical portion due to the surfaces of the projections on the insertion direction side being inclined in the direction opposite to the insertion direction, and thus insertion can continue to be performed. Then, when the projections reach the position of the corresponding through-holes or recessed portions, the projections that had been pressed by the outer cylindrical portion become inserted into the through-holes or the recessed portions and revert to their original positions, and thus the coupling of the one connector and the other connector is held. Also, in the case of decoupling the one connector and the other connector, by pulling a connector in the decoupling direction, the projections are pressed inward by the though-holes or the recessed portions due to the surfaces of the projections on the counter insertion direction side being inclined in the insertion direction, and thus the inner cylindrical portion can be pulled out of the outer cylindrical portion, in this way, similarly to the first and second aspects, the coupling and decoupling of the one connector and the other connector out of the pair of plug-in connectors can be performed easily at the sheath type temperature sensor replacement worksite.

Fourth Aspect

Instead of the method of holding the coupling of the pair of plug-in connectors in the first to third aspects, in a fourth aspect, out of the pair of plug-in connectors, the male connector and the female connector axe both provided with a cylindrical portion on sides thereof on which the connectors are coupled, the cylindrical portion of at least one of the connectors is at an end on a side that comes into contact with the other connector and the one connector and the other connector are coupled by the cylindrical portion of the other connector being inserted into the cylindrical portion provided at the end of the one connector, a plurality of projections are formed on an inner surface of the cylindrical portion of the one connector, surfaces of the projections on an insertion direction side being inclined in a direction opposite to the insertion direction, and surfaces of the projections on the counter insertion direction side being inclined in the insertion direction, and slits extending in approximately an axial direction are formed on respective sides of each of the projections, the other connector is provided with through-holes or recessed portions in an outer surface that respectively correspond to the projections provided on the inner surface of the one connector, and coupling of the one connector and the other connector is held by the projections provided on the one connector being respectively inserted into the through-holes or the recessed portions of the other connector.

According to the present invention, similarly to the first to third aspects, the need to perform the task of removing the leads of the sheath type temperature sensor from the wiring terminals and the task of connection to the wiring terminals at the sheath type temperature sensor replacement worksite is eliminated, and the parts other than the sheath type temperature sensor that need to be replaced are limited to the connector on the sheath type temperature sensor side, thus making it possible to minimize the number of replaced parts and suppress an increase in cost. Also, with the exception that the projections are pressed so as to move outward when coupling and pulling apart the one connector and the other connector out of the pair of plug-in connectors, the principles of coupling and decoupling of the one connector and the other connector are similar to the third aspect, and similarly to the third aspect, the coupling and decoupling of the one connector and the other connector out of the pair of plug-in connectors can be performed easily at the sheath type temperature sensor replacement worksite.

Fifth Aspect

Instead of the method of holding the coupling of the pair of plug-in connectors in the first to fourth aspects, in a fifth aspect, out of the male connector and the female connector making up the pair of plug-in connectors, the end of one connector on a side that comes into contact with the other connector is provided with a cylindrical portion, the end of the other connector on a side that comes into contact with the one connector is provided with a cylindrical portion or a columnar portion, and the one connector and the other connector are coupled by the cylindrical portion or the columnar portion of the other connector being inserted into the cylindrical portion provided at the end of the one connector, female threading is formed in an inner surface of the cylindrical portion of the one connector, and male threading is formed on an outer surface of the cylindrical portion or the columnar portion of the other connector, and coupling of the one connector and the other connector is held by threaded mating of the male threading and the female threading.

According to the present invention, similarly to the first to fourth aspects, the need to perform the task of removing the leads of the sheath type temperature sensor from the wiring terminals and the task of connection to the wiring terminals at the sheath type temperature sensor replacement worksite is eliminated, and the parts other than the sheath type temperature sensor that need to be replaced are limited to the connector on the sheath type temperature sensor side, thus making it possible to minimize the number of replaced parts and suppress an increase in cost. Also, the coupling is held by screwing together the female threading of the one connector and the male threading of the other connector, and decoupling is performed by unscrewing the female threading of the one connector and the male threading of the other connector and therefore similarly to the first to fourth aspects, the coupling and decoupling of the one connector and the other connector out of the pair of plug-in connectors can be performed easily at the sheath type temperature sensor replacement worksite.

Effects of the Invention

According to the terminal head according to the present invention, when replacing a sheath type temperature sensor, there is no need for fieldwork for removing the leads of the sheath type temperature sensor from the wiring terminals and for connection to the wiring terminals, and the sheath type temperature sensor can be replaced without a large increase in cost since the only part that is replaced along with the sheath type temperature sensor is the connector attached to the sheath type temperature sensor.

BRIEF DESCRIPTION OF DRAWINGS

FIG. 5(a) is a vertical cross-sectional view of a conventional terminal head of a sheath type temperature sensor FIG. 5(b) is a plan view along arrows C-C in FIG. 5(a). FIG. 5(c) is a cross-sectional view taken along D-D in FIG. 5(b).

MODES FOR CARRYING OUT THE INVENTION

Figure 1:
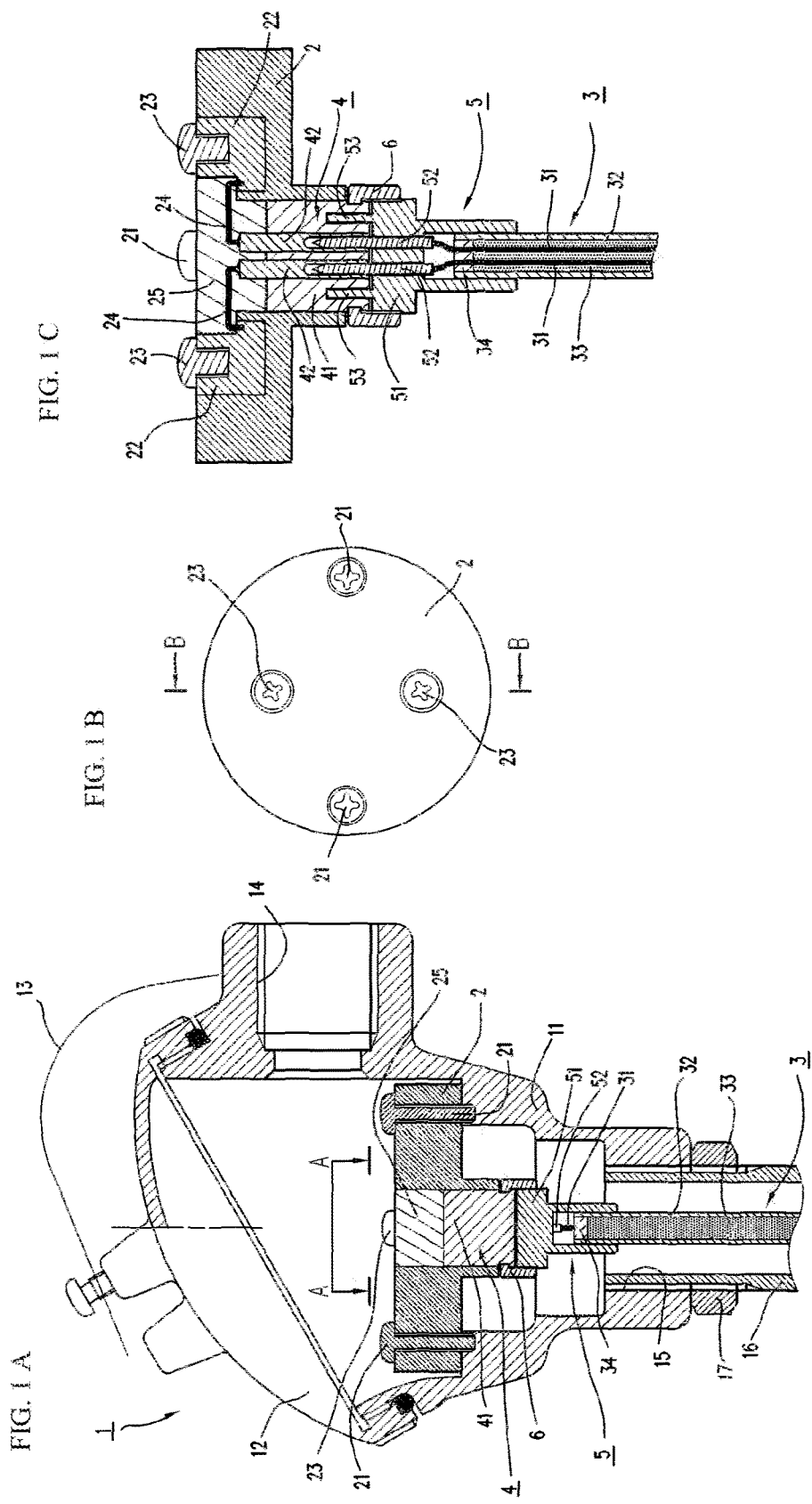
FIG. 1(a) is a vertical cross-sectional view of a terminal head of a sheath type temperature sensor in an embodiment of the present invention.
FIG. 1(b) is a plan view along arrows A-A in FIG. 1(a).
FIG. 1(c) is a cross-sectional view taken along R-B in FIG. 1(b).

An embodiment of the present invention will be described in detail below with reference to FIG. 1. FIG. 1(a) is a vertical cross-sectional view of a terminal head 1 of a sheath type temperature sensor 3 in an embodiment of the present invention, FIG. 1(b) is a plan view along arrows A-A in FIG. 1(a), and FIG. 1(c) is a cross-sectional view taken along B-B in FIG. Kb). The external form of the left half of a cover 12 is shown in FIG. 1(a). Note that FIG. 1 shows the case where the sheath type temperature sensor 3 has two leads 31.

In the sheath type temperature sensor 3, a thermocouple element wire or resistance temperature detector element type of temperature sensor is housed in a tube-shaped metal sheath 32 via an inorganic insulating powder 33 such as alumina or magnesia, and the terminal head 1 of the present embodiment is provided on the head portion of the sheath type temperature sensor 3 in order to connect the sheath type temperature sensor 3 and a cable (not shown) for transmitting signals from the sheath type temperature sensor 3.

The terminal head 1 is constituted by at least an outer frame body 11, a cover 12 for the outer frame body 11, a terminal plate 2, terminal plate fixing screws 21, cable wiring terminals 23, terminal fittings 22, a pair of plug-in connectors 4 and 5, a coupling nut 6, and connecting conductors 24.

The outer frame body 11 is provided with an upper opening to which the cover 12 is attached by screwing, a side opening 14 into which the above-described cable is inserted, and a bottom opening 15 into which the sheath type temperature sensor 3 is inserted approximately vertically. The cover 12 is connected to the outer frame body 11 by a chain 13 in order to prevent loss.

The terminal plate 2 is made of an electrical insulating material, and is fixed to the outer frame body 11 by terminal plate fixing screws 21. The horizontal dimension of the terminal plate 2 is smaller than the upper opening of the outer frame body 11, and the terminal plate 2 is disposed at a position where, by removing the terminal plate fixing screws 21 and moving it vertically upward, it can be removed from the outer frame body 11 through the upper opening in the outer frame body 11 from which the cover 12 was detached. Also, the same number of terminal fittings 22 as the number of leads 31 of the sheath type temperature sensor 3 are attached to the upper surface of the terminal plate 2, and cable wiring terminals 23 for the connection of respective leads of the cable are screwed into the terminal fittings 22.

In the present, embodiment, the horizontal dimension of the terminal plate 2 is 42 mm, the horizontal dimension of the upper opening in the outer frame body 11 is 60 mm at the smallest portion, and the combined dimensions of the outer frame body 11 and the cover 12 screwed thereto are 95 mm both vertically and horizontally but there is of course no limit to this.

The pair of plug-in connectors 4 and 5 are constituted by a connector 4 (female connector), in which the same number of female electrode pins 42 as the number of leads 31 of the sheath type temperature sensor 3 are provided inside a body 41 made of an electrical insulating resin, and a connector 5 (male connector), in which the same number of male electrode pins 52 as the number of female electrode pins 42 are provided inside a body 51 made of an electrical insulating resin. In the present embodiment, the female connector 4 is attached to the terminal plate 2, and the male connector 5 is attached to the upper end portion of a sheath 32 of the sheath type temperature sensor 3.

The connector 4 is fixed to the terminal plate 2 by an adhesive material, in an orientation in which the connector 5 is coupled thereto from below. Also, the upper end portions of the electrode pins 42 of the connector 4 and the cable wiring terminals 23 are respectively electrically connected by the terminal fittings 22 and the connecting conductors 24. In the state in which the connector 4 has been inserted into the connector 5 from above, and the connector 5 and the connector 4 are coupled, the upper end portion of the sheath 32 of the sheath type temperature sensor 3 is inserted into the lower portion of the cylindrical body 51 of the connector 5 such that the sheath type temperature sensor 3 is approximately vertical, and the connector 5 is fixed to the sheath 32 of the sheath type temperature sensor 3 by an adhesive material. The leads 31 protruding from the sheath 32 of the sheath type temperature sensor 3 are connected to the lower end portions of the electrode pins 52 of the connector 5. In the present embodiment, the connection of the electrode pins 42 of the connector 4 to the connecting conductors 24, the connecting conductors 24 to the terminal fittings 22, and the electrode pins 52 of the connector 5 to the lead 31 of the sheath type temperature sensor 3 is performed by soldering. Also, the outer diameter of the sheath 32 of the sheath type temperature sensor 3 of the present embodiment is 3.2 mm.

When the pair of connectors 4 and 5 are in the coupled state, the coupled state is held by the fastening of the coupling nut 6 that spans the two connectors.

The sheath type temperature sensor 3 and the cable are connected as described above.

The upper end surface of the sheath 32 of the sheath type temperature sensor 3 is provided with a resin seal 34 through which the leads 31 of the sheath type temperature sensor 3 pass, thus preventing the generation of temperature measurement error due to a reduction in the insulation resistance of the inorganic insulating powder 33 brought about by the entrance of moisture. Also, a protective tube 16 for preventing deformation of and damage to the sheath type temperature sensor 3 is fixed to the bottom opening 15 in the outer frame body 11 by screwing together a locknut 17 and the outer frame body 11.

Projections 53 on the body 51 of the connector 5 are for preventing the electrode pins 42 and 52 from becoming damaged by rotation of the connector 5 in the circumferential direction, but the projections 53 are not necessary if the electrode pins 42 and 52 are strong. Also, the upper portion of the connector 4 is filled with resin 25 so as to prevent electrical leakage between the pair of electrode pins 42 or between the pair of connecting conductors 24 due to the accumulation of dust. Pilling with the resin 25 is not necessary in the case of usage in a place that has no dust.

When the terminal plate 2, the terminal fittings 22, the cable wiring terminals 23, the pair of plug-in connectors 4 and 5, the coupling nut 6, and the sheath type temperature sensor 3 are assembled, the resulting one assembled piece is shaped such the horizontal dimension thereof does not exceed the horizontal dimension of the terminal plate 2 on its own. In the present embodiment, the horizontal dimension of the terminal plate 2 is the largest, and this dimension is 42 mm, which is smaller than the upper opening in the outer frame body 11 as previously described.

Accordingly with the terminal head 1, the sheath type temperature sensor 3 is replaced by removing the cover 12 of the outer frame body 11 and the terminal plate fixing screws 21, then removing the leads of the cable (not shown in FIG. 1) that are connected to the cable wiring terminals 23, and then removing the one piece constituted by the terminal plate 2 with the terminal fittings 22, the cable wiring terminals 23, the connecting conductors 24, and the connector 4 attached thereto; the connector 5 held in the state of being coupled to the connector 4 by the coupling nut 6; and the sheath type temperature sensor 3 with the connector 5 fixed thereto. By then moving the one piece vertically upward, it is possible to remove the one piece from the outer frame body 11 through the upper opening in the outer frame body 11.

Next, the coupling nut 6 is loosened, the connector 5 fixed to the sheath type temperature sensor 3 is removed from the connector 4, a prepared new connector 5 with a new sheath type temperature sensor 3 fixed thereto is coupled to the connector 4, and the coupled state is held by fastening the coupling nut 6. The piece re-integrated in this way is then inserted through the upper opening in the outer frame body 11 and fixed to the outer frame body 11 by the terminal plate fixing screws 21 of the terminal plate 2, the leads of the cable are connected to the cable wiring terminals 23, and the cover 12 of the outer frame body 11 is screwed to the outer frame body 11, and thus the replacement of the sheath type temperature sensor 3 is complete.

An embodiment corresponding to the first aspect has been described above. According to this, the need to perform the task of removing the leads 31 of the sheath type temperature sensor 3 from the wiring terminals and the task of connection to the wiring terminals at the replacement worksite is eliminated, and the parts other than the sheath type temperature sensor 3 that need to be replaced are limited to the connector 5, thus making it possible to suppress an increase in cost as well.

Figure 4:
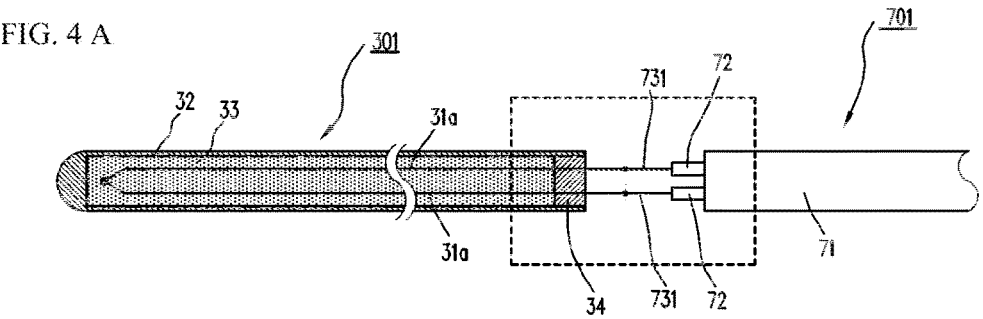
FIG. 4(a) is a diagram showing the connection relationship of a sheathed thermocouple.
FIG. 4(b) is a diagram showing the connection relationship of a sheathed resistance temperature detector.
Figure 4:
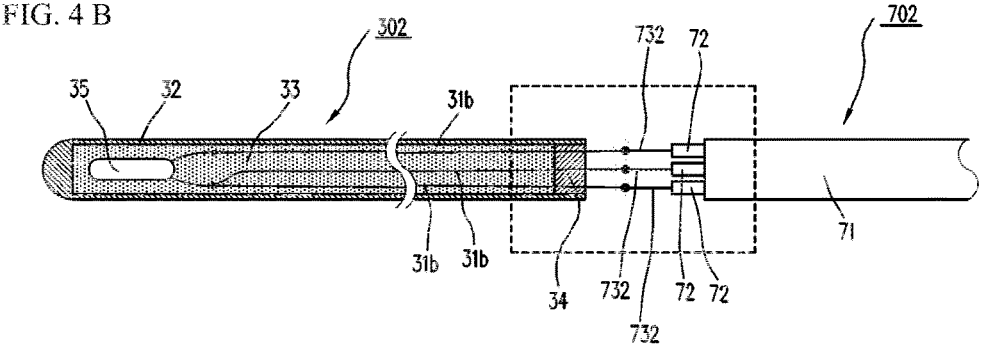

In the present embodiment, the connector 4 is provided with the female electrode pins 42, and the connector 5 is provided with the male electrode pins 52, but a configuration is possible in which the connector 4 is provided with male electrode pins, and the connector 5 is provided with female electrode pins. In this case, the connector 4 is the male connector, and the connector 5 is the female connector. Also, as described above, although FIG. 1 shows the case where the sheath type temperature sensor 3 has two leads 31, the number of sets of a cable wiring terminal 23, a terminal fitting 22, and a connecting conductor 24 that is needed is the same as the number of leads 31. Here, two sets are needed in the case where the sheath type temperature sensor is a sheathed thermocouple housing one pair of thermocouple element wires or is a two wire type sheathed resistance temperature detector as shown in the figure, four sets are needed in the case where the sheath type temperature sensor is a double element type sheathed thermocouple housing two pairs of thermocouple element wires, and three sets and four sets are respectively needed in the cases where the sheath type temperature sensor is a three wire and four wire type sheathed resistance temperature detector. As for correspondence with previously-described FIG. 4, the leads 31 in FIG. 1 are the leads 31a or 31b in FIG. 4.

In regards to the materials for the main constituent parts, in the present embodiment, metal mold casted aluminum is used for the outer frame body 11 and the cover 12 therefor, electrical insulating ceramic is used for the terminal plate 2, and electrical insulating resin is used for the bodies 41 and 51 of the connectors 4 and 5. The materials are not limited to these, and for example, stainless steel may be used for the outer frame body 11 and the cover 12 therefor, electrical insulating resin may be used for the terminal plate 2, and electrical insulating ceramic may be used for the bodies 41 and 51 of the connectors 4 and 5.

Also, when the sheath type temperature sensor 3 is a sheathed thermocouple, if the material for the electrode pins 42 and 52, the connecting conductors 24, and the terminal fittings 22 is a different material from the thermocouple element wires 31, there are cases where error occurs in temperature measurement due to the thermoelectromotive force in these portions being different from the thermoelectromotive force of the thermocouple element wires 31. Accordingly, it is desirable that when the sheath type temperature sensor 3 is a sheathed thermocouple, the material for the electrode pins 42 and 52, the connecting conductors 24, and the terminal fittings 22 is a material that has the same thermoelectromotive force as the thermocouple element wires 31 to which they are connected, that is to say the same material as the thermocouple element wires 31 or the same material as the compensating leads thereof.

Although the connector 4 is fixed to the terminal plate 2 using an adhesive material in the present embodiment, it may be fixed using another method such as screwing.

Also, although the sheath type temperature sensor 3 is fixed to the connector 5 using an adhesive material in the present embodiment, it may be fixed using constriction or screwing as described next.

Figure 2:
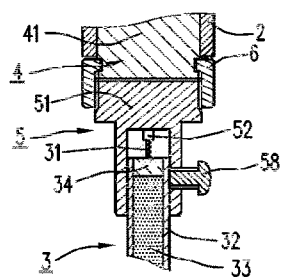
FIG. 2(a) is a cross-sectional view in which a connector is fixed to the sheath type temperature sensor using a connector attachment screw.
FIG. 2(b) is a cross-sectional view in which the connector is fixed to the sheath type temperature sensor using a constriction tube.
FIG. 2(c) is a side view of a lower cylinder portion of the connector on the sheath type temperature sensor side in FIG. 2(b).
Figure 2:
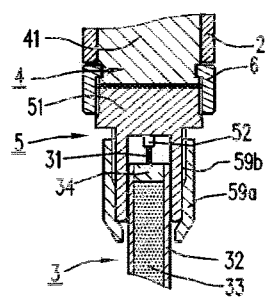
Figure 2:
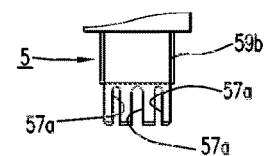

FIG. 2(a) is a cross-sectional, view in which the connector is fixed to the sheath type temperature sensor using a connector attachment screw. As shown in FIG. 2(a), the lower cylinder portion of the body 51 of the connector 5 may be fixed to the sheath 32 of the sheath type temperature sensor 3 using a connector attachment screw 58. Also, FIG. 2(b) is a cross-sectional view in which the connector is connected to the sheath type temperature sensor using a constriction tube, and FIG. 2(c) is a side view of the lower cylinder portion of the connector 5 on the sheath type temperature sensor side in FIG. 2(b). A configuration is possible in which slits 57a extending in the axial direction are formed over the entire circumference of the lower cylinder portion of the body 51 of the connector 5 so as to form strips as shown in FIG. 2(c), the strip portion with the slits 57a constricts the sheath 32 of the sheath type temperature sensor 3 when a constriction tube 59a having a narrow inner diameter in the tip portion provided on the outer side is rotated so as to move upward along threading 59b, and the lower cylinder portion of the body 51 of the connector 5 is fixed to the sheath 32 of the sheath type temperature sensor 3 using this constriction mechanism. More reliable fixing can be performed by increasing the coefficient of friction through providing protrusions and recessions on the inner surface of the strip portion.

Figure 3:
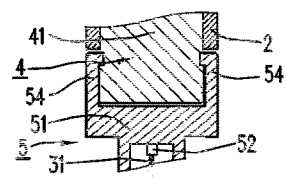
FIG. 3(a) is a cross-sectional view in which the coupling of connectors is held by arms having hook-shaped tips.
FIG. 3(b) is a cross-sectional view in which the coupling of connectors is held by projections and through-holes.
FIG. 3(c) is a side view of a cylindrical portion on the inner side in FIG. 3(b).
Figure 3:
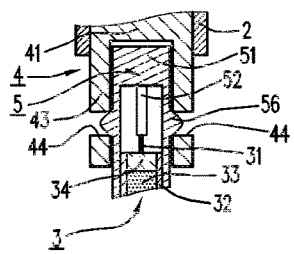
Figure 3:
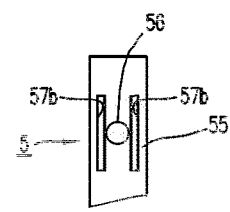

Next, an embodiment having a different mechanism for holding the coupling of the connector 4 and the connector 5 will be described with reference to FIG. 3.

FIG. 3(a) is a cross-sectional view in which the coupling of connectors is held by arms having hook-shaped tips. The coupling of the connector 4 and the connector 5 is not held by a coupling nut, but rather the side surface of the body 41 of the connector 4 is provided with recessed portions, the connector 5 is provided with multiple arms 54 that are made of the same electrical insulating resin as the body 51 of the connector 5 and have hook-shaped tips, and the coupling is held by engaging the hook-shaped portions of the arms 54 with the recessed portions. This configuration makes use of the elasticity of the electrical insulating resin that is the material making up the body 51 of the connector 5, and thus the connectors are coupled with the arms 54 pulled outward, and the coupling is held when the arms 54 revert to their original positions such that the hook-shaped portions engage with the recessed portions. Decoupling can be performed while pulling the arms 54 outward.

The holding of the coupling with this method corresponds to the second aspect. A configuration is possible in which the side surface of the body 51 of the connector 5 is provided with recessed portions, and the connector 4 is provided with multiple arms that are made of the same electrical insulating resin as the body 41 of the connector 4 and have hook-shaped tips, and thus the coupling is held.

Also, FIG. 3(b) is a cross-sectional view in which the coupling of the connectors is held by projections and through-holes, and FIG. 3(c) is a side view of a cylindrical portion on the inner side in FIG. 3(b). Instead of using a coupling nut or arms with hooks, the coupling of the connector 4 and the connector 5 is held due to the end of the body 41 of the connector 4 on the side to which the connector 5 is to be coupled being shaped as a cylindrical portion 43, and providing a cylindrical portion 55 in the end portion of the body 51 of the connector 5 to which the connector 4 is to be coupled. In the coupled state, the cylindrical portion 55 is inserted into the cylindrical portion 43 at the end. The outer surface of the cylindrical portion 55 is provided with multiple projections 56 whose surface on the insertion direction side is inclined in the direction opposite to the insertion direction and whose surface on the counter insertion direction side is inclined in the insertion direction, and the cylindrical portion 55 is provided with slits 57b extending approximately in the axial direction on the two sides of each projection 56. The coupling is held due to these projections 56 being inserted into through-holes 44 provided in the outer cylindrical portion 43 in correspondence with the projections 56.

The present embodiment also makes use of the elasticity of the electrical insulating resin that is the material making up the body 51 of the connector 5. The projections 56 on the cylindrical portion 55 can move a large amount in the diameter direction due to the existence of the slits 57b. In the insertion of the cylindrical portion 55 into the cylindrical portion 43 in order to couple the connectors 4 and 5, when the end of the cylindrical portion 43 reaches the position of the projections 56, the projections 56 are pushed inward by the end of the cylindrical portion 43 due to the surfaces of the projections 56 on the insertion direction side being inclined in the direction opposite to the insertion direction, and thus insertion can continue to be performed. Then, when the projections 56 reach a predetermined coupling position, that is to say the position of the corresponding through-holes 44, the projections 56 that had been pressed by the cylindrical portion 43 become inserted into the through-holes 44 and revert to their original positions, and thus the coupling is held.

In the case of decoupling the connectors, by pulling the body 41 of the connector 4 or the body 51 of the connector 5 in the decoupling direction, the projections 56 are pressed inward by the through-holes 44 due to the surfaces of the projections 56 on the counter insertion direction side being inclined in the insertion direction, and thus the cylindrical portion 55 can be pulled out of the cylindrical portion 43 so as to decouple the connectors.

Although the through-holes 44 are provided in the present embodiment, non-piercing recessed portions may be provided in the inner surface of the cylindrical portion 43 instead of the through-holes 44, and a configuration is possible in which the end of the body 51 of the connector 5 on the connector 4 side is shaped as a cylinder through-holes or recessed portions in the inner surface are provided, a cylindrical portion having slits and projections on the surface is provided in the end portion of the body 41 of the connector 4 on the side to which the connector 5 is to be coupled, and cylindrical portion of the connector 4 is inserted into the cylindrical portion of the connector 5.

The above-described holding of the coupling using the projections 58 and the through-holes 44 or recessed portions corresponds to the third aspect.

Furthermore, as shown in the fourth aspect, the projections 56 and the slits 57b may be provided on the inner surface of the outer cylindrical portion, and the through-holes 44 or the recessed portions may be provided on the inner cylindrical portion. In this case as well, the principles of operation are the same as the embodiment corresponding to the third aspect, with the exception that the projections are pressed so as to move outward when coupling and separating the pair of plug-in connectors. Note that in this embodiment, the inner cylindrical portion does not need to have elasticity, and thus may be shaped as a column.

Methods other than those of the above embodiments may be used as the method for holding the coupling of the connector 4 and the connector 5. As shown in the fifth aspect, a configuration is possible in which, in the coupling portion of the connector 4 and the connector 5, male threading is formed on the outer surface of the inner cylindrical portion or columnar portion, female threading is formed in the inner surface of the outer cylindrical portion, and the coupling is held by screwing together the male threading and the female threading. Also, similarly to the method of fixing the sheath type temperature sensor 3 in FIG. 2(a), the coupling of the connector 4 and the connector 5 may be held by a screw, and similarly to the method of fixing the sheath type temperature sensor 3 in FIGS. 2(b) and 2(c), the coupling may be held by forming slits over the entire circumference of the end of the outer cylindrical portion and constricting the inserted connector using a constriction tube.

Although modes for earning out the present invention have been described above, the present invention is of course not restricted by the above embodiments. Appropriate changes can of course be carried out within a scope applicable to the gist of the present invention, and all such changes are embraced within the technical scope of the present invention.

INDUSTRIAL APPLICABILITY

The present invention is applicable as a terminal head of a sheath type temperature sensor for connecting a cable and the sheath type temperature sensor, which is specifically a temperature sensor that is a sheathed thermocouple or a sheathed resistance temperature detector. In particular, the present invention exhibits effects as a terminal head of a sheath type temperature sensor that has a short replacement cycle due to being used with the tip portion inserted into an extreme environment such as a high-temperature atmosphere or a corrosive atmosphere.

DESCRIPTION OF REFERENCE NUMERALS

1 Terminal head
11 Outer frame body
12 Cover
2 Terminal plate
21 Terminal plate fixing screw
22 Terminal fitting
23 Cable wiring terminal 24 Connecting conductor
3 Sheath type temperature sensor
31 Lead
32 Sheath
33 Inorganic insulating powder
34 Resin seal
4 Connector (terminal plate side)
41 Body
42 Female electrode pin
5 Connector (sheath type temperature sensor side)
51 Body
52 Male electrode pin
6 Coupling nut

The invention claimed is:

1. A terminal head of a sheath type temperature sensor provided for connection of a sheath type temperature sensor, in which a temperature sensor is housed in a tube-shaped metal sheath via inorganic insulating powder, to a cable for transmission of a signal from the temperature sensor, the terminal head comprising:

an outer frame body having an upper opening formed in an upper portion, a side opening that is formed in a side portion and receives insertion of the cable, and a bottom opening that is formed in a bottom portion and receives approximately vertical insertion of the sheath type temperature sensor;

a cover attached to the upper opening of the outer frame body by threaded mating;

a terminal plate that is made of an electrical insulating material, is fixed to an inner portion of the outer frame body by a plurality of terminal plate fixing screws, has a smaller horizontal dimension than the horizontal dimension of the upper opening of the outer frame body, and is provided at a position at which, by removing the terminal plate fixing screws and moving the terminal plate vertically upward, the terminal plate can be removed from the outer frame body through the upper opening of the outer frame body from which the cover was detached;

terminal fittings attached to an upper surface of the terminal plate, the number of terminal fittings being the same as the number of leads of the sheath type temperature sensor;

cable wiring terminals for respectively connecting leads of the cable to the terminal fittings by threaded mating to the terminal fittings;

a pair of plug-in connectors, one of which is a male connector in which the same number of male electrode pins as the number of leads of the sheath type temperature sensor are provided in a body made of electrical insulating resin, and the other of which is a female connector in which the same number of female electrode pins as the number of electrode pins of the male connector are provided in a body made of electrical insulating resin, one connector out of the male connector and the female connector being attached to the terminal plate, and the other connector being attached to an upper end portion of the sheath of the sheath type temperature sensor; and a coupling nut that, in a state in which the connector attached to the terminal plate side and the connector connected to the sheath type temperature sensor side are coupled, holds the coupled state by threaded fastening at positions that span the two connectors, wherein the connector attached to the terminal plate side is fixed to the terminal plate in an orientation in which the connector attached to the sheath type temperature sensor side is coupled thereto from below and the electrode pins of the connector attached to the terminal plate side and the cable wiring terminals are electrically connected by the terminal fittings and connecting conductors that connect upper end portions of the electrode pins and the terminal fittings, the connector attached to the sheath type temperature sensor side is fixed to the sheath type temperature sensor in an orientation in which the connector attached to the terminal plate side is coupled thereto from above, and is fixed in a state in which the upper end portion of the sheath of the sheath type temperature sensor is inserted into a lower portion of the cylindrical body of the connector attached to the sheath type temperature sensor side such that the sheath type temperature sensor is approximately vertical in the coupled state, and the leads of the sheath type temperature sensor protruding from the sheath are respectively connected to lower end portions of the electrode pins of the connector attached to the sheath type temperature sensor side, and in a state in which the terminal plate, the terminal fittings, the cable wiring terminals, the pair of plug-in connectors, the coupling nut, and the sheath type temperature sensor are assembled, the horizontal dimension of the assembled one piece does not exceed the horizontal dimension of the terminal plate.

2. A terminal head of a sheath type temperature sensor provided for connection of a sheath type temperature sensor in which a temperature sensor is housed in a tube-shaped metal sheath via inorganic insulating powder, to a cable for transmission of a signal from the temperature sensor, the terminal head comprising:

an outer frame body having an upper opening formed in an upper portion, a side opening that is formed in a side portion and receives insertion of the cable, and a bottom opening that is formed in a bottom portion and receives approximately vertical insertion of the sheath type temperature sensor;

a cover attached to the upper opening of the outer frame body by threaded mating;

a terminal plate that is made of an electrical insulating material, is fixed to an inner portion of the outer frame body by a plurality of terminal plate fixing screws, has a smaller horizontal dimension than the horizontal dimension of the upper opening of the outer frame body and is provided at a position at which, by removing the terminal plate fixing screws and moving the terminal plate vertically upward, the terminal plate can be removed from the outer frame body through the upper opening of the outer frame body from which the cover was detached;

terminal fittings attached to an upper surface of the terminal plate, the number of terminal fittings being the same as the number of leads of the sheath type temperature sensor;

cable wiring terminals for respectively connecting leads of the cable to the terminal fittings by threaded mating to the terminal fittings; and a pair of plug-in connectors, one of which is a male connector in which the same number of male electrode pins as the number of leads of the sheath type temperature sensor are provided in a body made of electrical insulating resin, and the other of which is a female connector in which the same number of female electrode pins as the number of electrode pins of the male connector are provided in a body made of electrical insulating resin, one connector out of the male connector and the female connector being attached to the terminal plate, and the other connector being attached to an upper end portion of the sheath of the sheath type temperature sensor, wherein the connector attached to the terminal plate side is fixed to the terminal plate in an orientation in which the connector attached to the sheath type temperature sensor side is coupled thereto from below, and the electrode pins of the connector attached to the terminal plate side and the cable wiring terminals are electrically connected by the terminal fittings and connecting conductors that connect upper end portions of the electrode pins and the terminal fittings, the connector attached to the sheath type temperature sensor side is fixed to the sheath type temperature sensor in an orientation in which the connector attached to the terminal plate side is coupled thereto from above, and is fixed in a state in which the upper end portion of the sheath of the sheath type temperature sensor is inserted into a lower portion of the cylindrical body of the connector attached to the sheath type temperature sensor side such that the sheath type temperature sensor is approximately vertical in the coupled state, and the leads of the sheath type temperature sensor protruding from the sheath are respectively connected to lower end portions of the electrode pins of the connector attached to the sheath type temperature sensor side, out of the pair of plug-in connectors, a side surface of one of the connectors is provided with a plurality of recessed portions, the other connector is provided with a plurality of arms that have hook-shaped tips and are made of the same electrical insulating resin as the body of the other connector, and the coupling of the one connector and the other connector is held by engaging the hook-shaped portions of the arms of the other connector with the recessed portions of the one connector, and in a state in which the terminal plate, the terminal fittings, the cable wiring terminals, the pair of plug-in connectors, and the sheath type temperature sensor are assembled, the horizontal dimension of the assembled one piece does not exceed the horizontal dimension of the terminal plate.

3. A terminal head of a sheath type temperature sensor provided for connection of a sheath type temperature sensor, in which a temperature sensor is housed in a tube-shaped metal sheath via inorganic insulating powder, to a cable for transmission of a signal from the temperature sensor, the terminal head comprising:

an outer frame body having an upper opening formed in an upper portion, a side opening that is formed in a side portion and receives insertion of the cable, and a bottom opening that is formed in a bottom portion and receives approximately vertical insertion of the sheath type temperature sensor;

a cover attached to the upper opening of the outer frame body by threaded mating;

a terminal plate that is made of an electrical insulating material, is fixed to an inner portion of the outer frame body by a plurality of terminal plate fixing screws, has a smaller horizontal dimension than the horizontal dimension of the upper opening of the outer frame body, and is provided at a position at which, by removing the terminal plate fixing screws and moving the terminal plate vertically upward, the terminal plate can be removed from the outer frame body through the upper opening of the outer frame body from which the cover was detached;

terminal fittings attached to an upper surface of the terminal plate, the number of terminal fittings being the same as the number of leads of the sheath type temperature sensor;

cable wiring terminals for respectively connecting leads of the cable to the terminal fittings by threaded mating to the terminal fittings; and a pair of plug-in connectors, one of which is a male connector in which the same number of male electrode pins as the number of leads of the sheath type temperature sensor are provided in a body made of electrical insulating resin, and the other of which is a female connector in which the same number of female electrode pins as the number of electrode pins of the male connector are provided in a body made of electrical insulating resin, one connector out of the male connector and the female connector being attached to the terminal plate, and the other connector being attached to an upper end portion of the sheath of the sheath type temperature sensor, wherein the connector attached to the terminal plate side is fixed to the terminal plate in an orientation in which the connector attached to the sheath type temperature sensor side is coupled thereto from below, and the electrode pins of the connector attached to the terminal plate side and the cable wiring terminals are electrically connected by the terminal fittings and connecting conductors that connect upper end portions of the electrode pins and the terminal fittings, the connector attached to the sheath type temperature sensor side is fixed to the sheath type temperature sensor in an orientation in which the connector attached to the terminal plate side is coupled thereto from above, and is fixed in a state in which the upper end portion of the sheath of the sheath type temperature sensor is inserted into a lower portion of the cylindrical body of the connector attached to the sheath type temperature sensor side such that the sheath type temperature sensor is approximately vertical in the coupled state, and the leads of the sheath type temperature sensor protruding from the sheath are respectively connected to lower end portions of the electrode pins of the connector attached, to the sheath type temperature sensor side, out of the pair of plug-in connectors, the male connector and the female connector are both provided with a cylindrical portion on sides thereof on which the connectors are coupled, the cylindrical portion of at least one of the connectors is at an end on a side that comes into contact with the other connector and the one connector and the other connector are coupled by the cylindrical portion of the other connector being inserted into the cylindrical portion provided at the end of the one connector, a plurality of projections are formed on an outer surface of the cylindrical portion of the other connector surfaces of the projections on an insertion direction side being inclined in a direction opposite to the insertion direction, and surfaces of the projections on the counter insertion direction side being inclined in the insertion direction, and slits extending in approximately an axial direction are formed on respective sides of each of the projections, the cylindrical portion of the one connector is provided with through-holes or recessed portions in an inner surface that respectively correspond to the projections provided on the outer surface of the other connector, coupling of the one connector and the other connector is held by the projections provided on the other connector being respectively inserted into the through-holes or the recessed portions of the one connector, and in a state in which the terminal plate, the terminal fittings, the cable wiring terminals, the pair of plug-in connectors, and the sheath type temperature sensor are assembled, the horizontal dimension of the assembled one piece does not exceed the horizontal dimension of the terminal plate.

4. A terminal head of a sheath type temperature sensor provided for connection of a sheath type temperature sensor, in which a temperature sensor is housed in a tube-shaped metal sheath via inorganic insulating powder to a cable for transmission of a signal from the temperature sensor the terminal head comprising:

an outer frame body having an upper opening formed in an upper portion, a side opening that is formed in a side portion and receives insertion of die cable, and a bottom opening that is formed in a bottom portion and receives approximately vertical insertion of the sheath type temperature sensor;

a cover attached to the upper opening of the outer frame body by threaded mating;

a terminal plate that is made of an electrical insulating material, is fixed to an inner portion of the outer frame body by a plurality of terminal plate fixing screws, has a smaller horizontal dimension than the horizontal dimension of the upper opening of the outer frame body and is provided at a position at which, by removing the terminal plate fixing screws and moving the terminal plate vertically upward, the terminal plate can be removed from the outer frame body through the upper opening of the outer frame body from which the cover was detached;

terminal fittings attached to an upper surface of the terminal plate, the number of terminal fittings being the same as the number of leads of the sheath type temperature sensor;

cable wiring terminals for respectively connecting leads of the cable to the terminal fittings by threaded mating to the terminal fittings; and a pair of plug-in connectors, one of which is a male connector in which the same number of male electrode pins as the number of leads of the sheath type temperature sensor are provided in a body made of electrical insulating resin, and the other of which is a female connector in which the same number of female electrode pins as the number of electrode pins of die male connector are provided in a body made of electrical insulating resin, one connector out of the male connector and the female connector being attached to the terminal plate, and the other connector being attached to an upper end portion of the sheath of the sheath type temperature sensor, wherein the connector attached to the terminal plate side is fixed to the terminal plate in an orientation in which the connector attached to the sheath type temperature sensor side is coupled thereto from below and the electrode pins of the connector attached to the terminal plate side and the cable wiring terminals are electrically connected by the terminal fittings and connecting conductors that connect upper end portions of the electrode pins and the terminal fittings, the connector attached to the sheath type temperature sensor side is fixed to the sheath type temperature sensor in an orientation in which the connector attached to the terminal plate side is coupled thereto from above, and is fixed in a state in which the upper end portion of the sheath of the sheath type temperature sensor is inserted into a lower portion of the cylindrical body of the connector attached to the sheath type temperature sensor side such that the sheath type temperature sensor is approximately vertical in the coupled state, and the leads of the sheath type temperature sensor protruding from the sheath are respectively connected to lower end portions of the electrode pins of the connector attached to the sheath type temperature sensor side, out of the pair of plug-in connectors, the male connector and the female connector are both provided with a cylindrical portion on sides thereof on which the connectors are coupled, the cylindrical portion of at least one of the connectors is at an end on a side that comes into contact with the other connector, and the one connector and the other connector are coupled by the cylindrical portion of the other connector being inserted into the cylindrical portion provided at the end of the one connector, a plurality of projections are formed on an inner surface of the cylindrical portion of the one connector, surfaces of the projections on an insertion direction side being inclined in a direction opposite to the insertion direction, and surfaces of the projections on the counter insertion direction side being inclined in the insertion direction, and slits extending in approximately an axial direction are formed on respective sides of each of the projections, the other connector is provided with through-holes or recessed portions in an outer surface that respectively correspond to the projections provided on the inner surface of the one connector, coupling of the one connector and the other connector is held by the projections provided on the one connector being respectively inserted into the through-holes or the recessed portions of the other connector, and in a state in which the terminal plate, the terminal fittings, the cable wiring terminals, the pair of plug-in connectors, and the sheath type temperature sensor are assembled, the horizontal dimension of the assembled one piece does not exceed the horizontal dimension of the terminal plate.

5. A terminal head of a sheath type temperature sensor provided for connection of a sheath type temperature sensor in which a temperature sensor is housed in a tube-shaped metal sheath via inorganic insulating powder, to a cable for transmission of a signal from the temperature sensor the terminal head comprising:

an outer frame body having an upper opening formed in an upper portion, a side opening that is formed in a side portion and receives insertion of the cable, and a bottom opening that is formed in a bottom portion and receives approximately vertical insertion of the sheath type temperature sensor;

a cover attached to the upper opening of the outer frame body by threaded mating;

a terminal plate that is made of an electrical insulating material is fixed to an inner portion of the outer frame body by a plurality of terminal plate fixing screws, has a smaller horizontal dimension than the horizontal dimension of the upper opening of the outer frame body and is provided at a position at which, by removing the terminal plate fixing screws and moving the terminal plate vertically upward, the terminal plate can be removed from the outer frame body through the upper opening of the outer frame body from which the cover was detached;

terminal fittings attached to an upper surface of the terminal plate, the number of terminal fittings being the same as the number of leads of the sheath type temperature sensor;

cable wiring terminals for respectively connecting leads of the cable to the terminal fittings by threaded mating to the terminal fittings; and a pair of plug-in connectors, one of which is a male connector in which the same number of male electrode pins as the number of leads of the sheath type temperature sensor are provided in a body made of electrical insulating resin, and the other of which is a female connector in which the same number of female electrode pins as the number of electrode pins of the male connector are provided in a body made of electrical insulating resin, one connector out of the male connector and the female connector being attached to the terminal plate, and the other connector being attached to an upper end portion of the sheath of the sheath type temperature sensor, wherein the connector attached to the terminal plate side is fixed to the terminal plate in an orientation in which the connector attached to the sheath type temperature sensor side is coupled thereto from below, and the electrode pins of the connector attached to the terminal plate side and the cable wiring terminals are electrically connected by the terminal fittings and connecting conductors that connect upper end portions of the electrode pins and the terminal fittings, the connector attached to the sheath type temperature sensor side is fixed to the sheath type temperature sensor in an orientation in which the connector attached to the terminal plate side is coupled thereto from above, and is fixed in a state in which the upper end portion of the sheath of the sheath type temperature sensor is inserted into a lower portion of the cylindrical body of the connector attached to the sheath type temperature sensor side such that the sheath type temperature sensor is approximately vertical in the coupled state, and the leads of the sheath type temperature sensor protruding from the sheath are respectively connected to lower end portions of the electrode pins of the connector attached to the sheath type temperature sensor side, out of the male connector and the female connector making up the pair of plug-in connectors, the end of one connector on a side that comes into contact with the other connector is provided with a cylindrical portion, the end of the other connector on a side that comes into contact with the one connector is provided with a cylindrical portion or a columnar portion, and the one connector and the other connector are coupled by the cylindrical portion or the columnar portion of the other connector being inserted into the cylindrical portion provided at the end of the one connector, female threading is formed in an inner surface of the cylindrical portion of the one connector, and male threading is formed on an outer surface of the cylindrical portion or the columnar portion of the other connector, coupling of the one connector and the other connector is held by threaded mating of the male threading and the female threading, and in a state in which the terminal plate, the terminal fittings, the cable wiring terminals, the pair of plug-in connectors, and the sheath type temperature sensor are assembled, the horizontal dimension of the assembled one piece does not exceed the horizontal dimension of the terminal plate.

* * * * *

UNITED STATES PATENT AND TRADEMARK OFFICE
CERTIFICATE OF CORRECTION

PATENT NO. : 9,671,295 B2
APPLICATION NO. : 14/419725
DATED : June 6, 2017
INVENTOR(S) : Makoto Terada et al.

Page 1 of 1

It is certified that error appears in the above-identified patent and that said Letters Patent is hereby corrected as shown below:

In the Specification

Column 2, Line 21, replace "firing" with -- fixing --.

Column 3, Line 43, replace "801" with -- 301 --.

Column 6, Line 53, replace "axe" with -- are --.

Column 9, Line 8, replace "axe" with -- are --.

Column 10, Line 46, replace "R-B" with -- B-B --.

Column 11, Line 10, replace "FIG. Kb)" with -- FIG. 1(b) --.

Column 11, Line 52, replace "present," with -- present --.

Column 12, Line 52, replace "Pilling" with -- Filling --.

Column 14, Line 26, replace "cross-sectional," with -- cross-sectional --.

Column 16, Line 7, replace "58" with -- 56 --.

Column 16, Line 38, replace "earning" with -- carrying --.

Signed and Sealed this
Twenty-first Day of November, 2017

Joseph Matal
*Performing the Functions and Duties of the
Under Secretary of Commerce for Intellectual Property and
Director of the United States Patent and Trademark Office*